US011364681B2

(12) United States Patent
Groenenboom et al.

(10) Patent No.: US 11,364,681 B2
(45) Date of Patent: Jun. 21, 2022

(54) LIFT TO LOWER AND RAISE A PLATFORM

(71) Applicant: HEWLETT-PACKARD DEVELOPMENT COMPANY, L.P., Houston, TX (US)

(72) Inventors: Mark Groenenboom, Sumner, WA (US); Randall West, Vancouver, WA (US); Tait A. Regnier, Vancouver, WA (US); Robert Winburne, Vancouver, WA (US); Jeffrey G. Bingham, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 923 days.

(21) Appl. No.: 16/075,476

(22) PCT Filed: Jun. 28, 2017

(86) PCT No.: PCT/US2017/039747
§ 371 (c)(1),
(2) Date: Aug. 3, 2018

(87) PCT Pub. No.: WO2019/005040
PCT Pub. Date: Jan. 3, 2019

(65) Prior Publication Data
US 2021/0206069 A1     Jul. 8, 2021

(51) Int. Cl.
*B29C 64/245*     (2017.01)
*B33Y 30/00*     (2015.01)
*B29C 64/232*     (2017.01)
*B66F 7/02*     (2006.01)

(52) U.S. Cl.
CPC .......... *B29C 64/245* (2017.08); *B29C 64/232* (2017.08); *B33Y 30/00* (2014.12); *B66F 7/025* (2013.01)

(58) Field of Classification Search
CPC ..... B29C 64/245; B29C 64/232; B33Y 30/00; B66F 7/025
See application file for complete search history.

(56) References Cited

U.S. PATENT DOCUMENTS

| 4,319,738 A | * | 3/1982 | Nussbaum | B66F 17/00 254/89 R |
| 4,967,947 A | * | 11/1990 | Sarh | B21J 15/14 227/156 |
| 6,722,872 B1 | | 4/2004 | Swanson et al. | |
| 9,481,134 B2 | | 11/2016 | Steiner et al. | |
| 9,597,731 B2 | | 3/2017 | Volk | |

(Continued)

FOREIGN PATENT DOCUMENTS

| CN | 203267484 U | 11/2013 |
| CN | 204658955 U | 9/2015 |

(Continued)

*Primary Examiner* — Joseph S Del Sole
*Assistant Examiner* — John Robitaille
(74) *Attorney, Agent, or Firm* — Dierker & Kavanaugh PC

(57) ABSTRACT

In one example, a platform lift includes a rotationally stationary leadscrew to support a platform, a rotatable nut to drive the leadscrew up and down through a range of motion, a first spring to apply a continuous downward force to the leadscrew throughout the range of motion, and a second spring to apply a continuous upward force to the leadscrew throughout the range of motion.

14 Claims, 10 Drawing Sheets

(56) References Cited

U.S. PATENT DOCUMENTS

| | | | |
|---|---|---|---|
| 2008/0179787 A1* | 7/2008 | Sperry | B33Y 40/00 264/308 |
| 2014/0085620 A1 | 3/2014 | Lobovsky et al. | |
| 2016/0236409 A1 | 8/2016 | Armani et al. | |

FOREIGN PATENT DOCUMENTS

| | | | |
|---|---|---|---|
| CN | 205326295 U | 6/2016 | |
| CN | 106626368 A | 5/2017 | |
| RU | 2567318 C1 | 11/2015 | |

* cited by examiner

LIFT TO LOWER AND RAISE A PLATFORM

BACKGROUND

Additive manufacturing machines produce 3D (three-dimensional) objects by building up layers of material. Some additive manufacturing machines are commonly referred to as "3D printers." 3D printers and other additive manufacturing machines make it possible to convert a CAD (computer aided design) model or other digital representation of an object into the physical object. The model data may be processed into slices each defining that part of a layer or layers of build material to be formed into the object.

DRAWINGS

FIGS. 2 and 3 show the unit with the build platform in a raised position.

FIG. 4 shows the unit with the build platform in a lowered position.

The same part numbers designate the same or similar parts throughout the figures. The figures are not necessarily to scale.

DESCRIPTION

In some additive manufacturing processes, heat is used to fuse together the particles in successive layers of a powdered build material to form a solid object. One of the challenges of additive manufacturing with powdered build materials is accurately lowering the build platform incrementally for each layer of build material. A build cycle may include hundreds or thousands of layers of build material each less than, for example, 100 microns thick. A lift lowers the platform by the layer thickness for each succeeding layer of build material. In some additive manufacturing machines, the drive system in the lift should be able to lower the platform for each layer within a tolerance of a few microns.

A new lift has been developed to help accurately and cost effectively lower a build platform in an additive manufacturing machine. In one example, a lift includes a rotationally stationary leadscrew to support a platform, a rotatable drive nut to drive the leadscrew up and down, an anti-backlash spring to apply a continuous downward force to the leadscrew, and a counter-balance spring to apply a continuous upward force to the leadscrew. As the leadscrew moves down to lower the platform, the downward force of the anti-backlash spring decreases and the upward force of the counter-balance spring increases to compensate for the weight of the build material added to the platform at each increment of lowering. The springs are designed so that, excluding forces exerted by the drive nut, the total downward forces acting on the leadscrew are always greater than the total upward forces acting on the leadscrew to inhibit backlash throughout the full range of motion of the leadscrew, and so that the net magnitude of the downward forces stays within a desired range.

This and other examples of the new lift help maintain lower, more consistent forces in the lift drive system, thus enabling the use of less expensive components, a commodity leadscrew and plastic drive nut for example. Although examples of the lift are described with reference to a build platform for an additive manufacturing machine, examples are not limited to additive manufacturing but may be implemented in other devices and for other applications. The examples shown and described illustrate but do not limit the scope of the patent, which is defined in the Claims following this Description.

As used in this document, "suspend" means to suspend something above a support or below a support and, accordingly, the "suspenders" on which a thing is suspended may hang from the support or sit atop the support.

Figure 1:
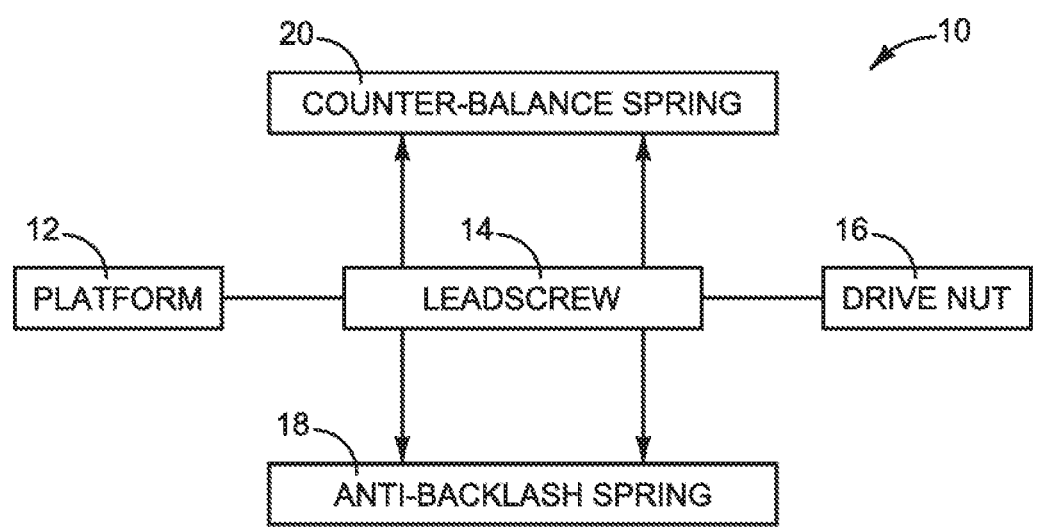
FIG. 1 is a block diagram illustrating one example of a lift to lower and raise a platform, such as might be used in a build unit for an additive manufacturing machine.

FIG. 1 is a block diagram illustrating one example of a lift 10 to raise and lower a platform 12, such as might be used in a build unit for an additive manufacturing machine. Referring to FIG. 1, lift 10 includes a rotationally stationary leadscrew 14 operatively connected to platform 12 and a translationally stationary drive nut 16 to drive leadscrew 14 up and down. "Rotationally stationary" and "translationally stationary" refer to the operational relationship between leadscrew 14 and drive nut 16. During the operation of lift 10, leadscrew 14 does not rotate and drive nut 16 does not move up and down. Thus, rotating drive nut 16 around leadscrew 14 drives leadscrew 14 linearly up and down (referred to as translation), depending on the direction of rotation of nut 16. "Rotationally stationary" and "translationally stationary" do not mean the parts cannot be rotated or translated in other contexts, for example during shipping and handling.

Lift 10 also includes an anti-backlash spring 18 to apply a continuous downward force to leadscrew 14 and a counter-balance spring 20 to apply a continuous upward force to leadscrew 14. In one example, springs 18 and 20 are configured so that, excluding forces exerted on leadscrew 14 by drive nut 16, the total downward forces acting on leadscrew 14 are greater than the total upward forces acting on leadscrew 14 throughout a full range of motion, and by a consistent margin so that the net anti-backlash force of leadscrew 14 on drive nut 16 stays within a desired range. Thus, for example, in a build unit for additive manufacturing, as leadscrew 14 is driven down to lower platform 12, the downward force of anti-backlash spring 18 decreases and the upward force of counter-balance spring 20 increases to compensate for the weight of each layer of build material added to platform 12 at each increment of lowering.

Figure 2:
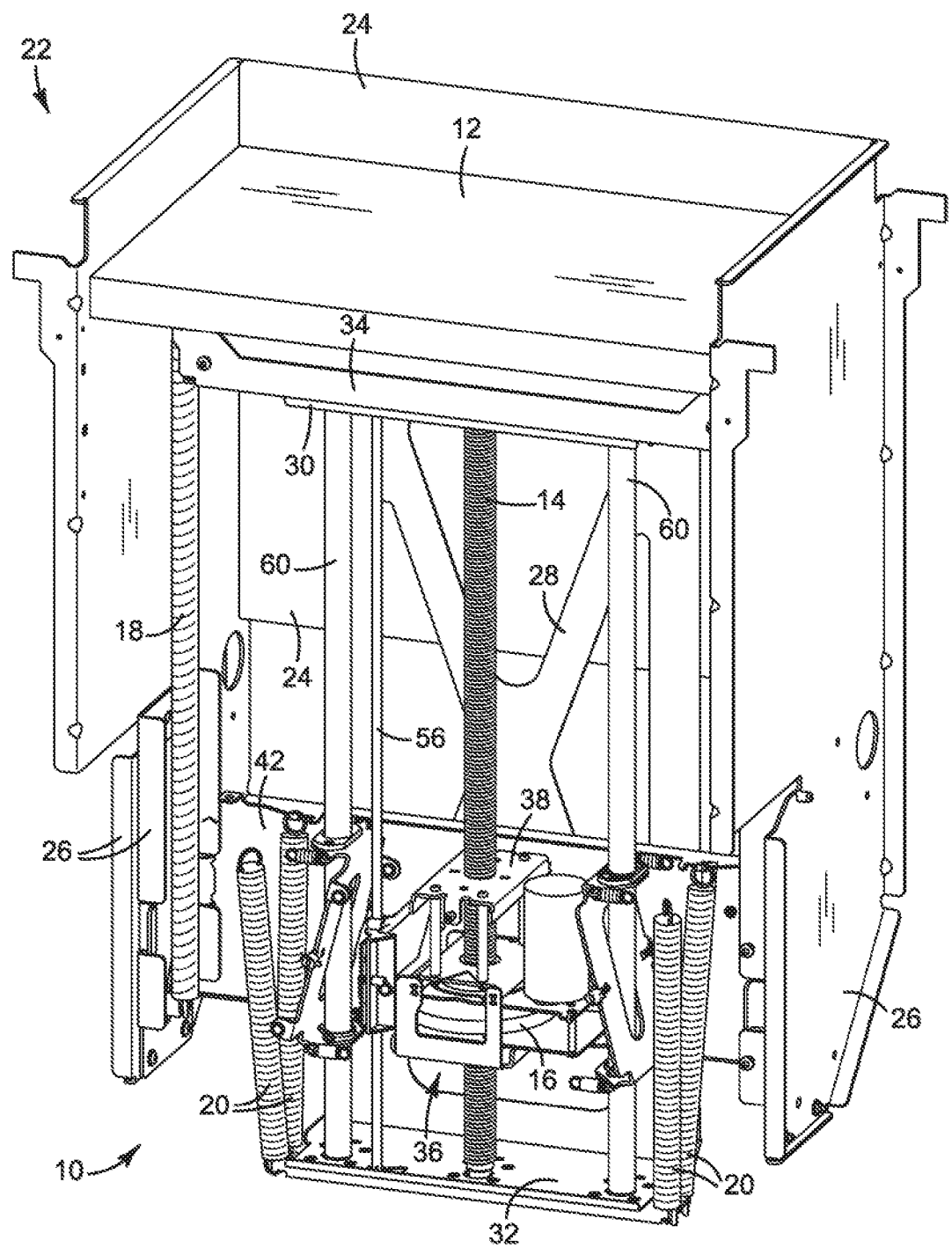
FIG. 2 is an isometric view and FIGS. 3-4 are elevation views illustrating a build unit for an additive manufacturing machine implementing one example of a lift to lower and raise the build platform.
Figure 3:
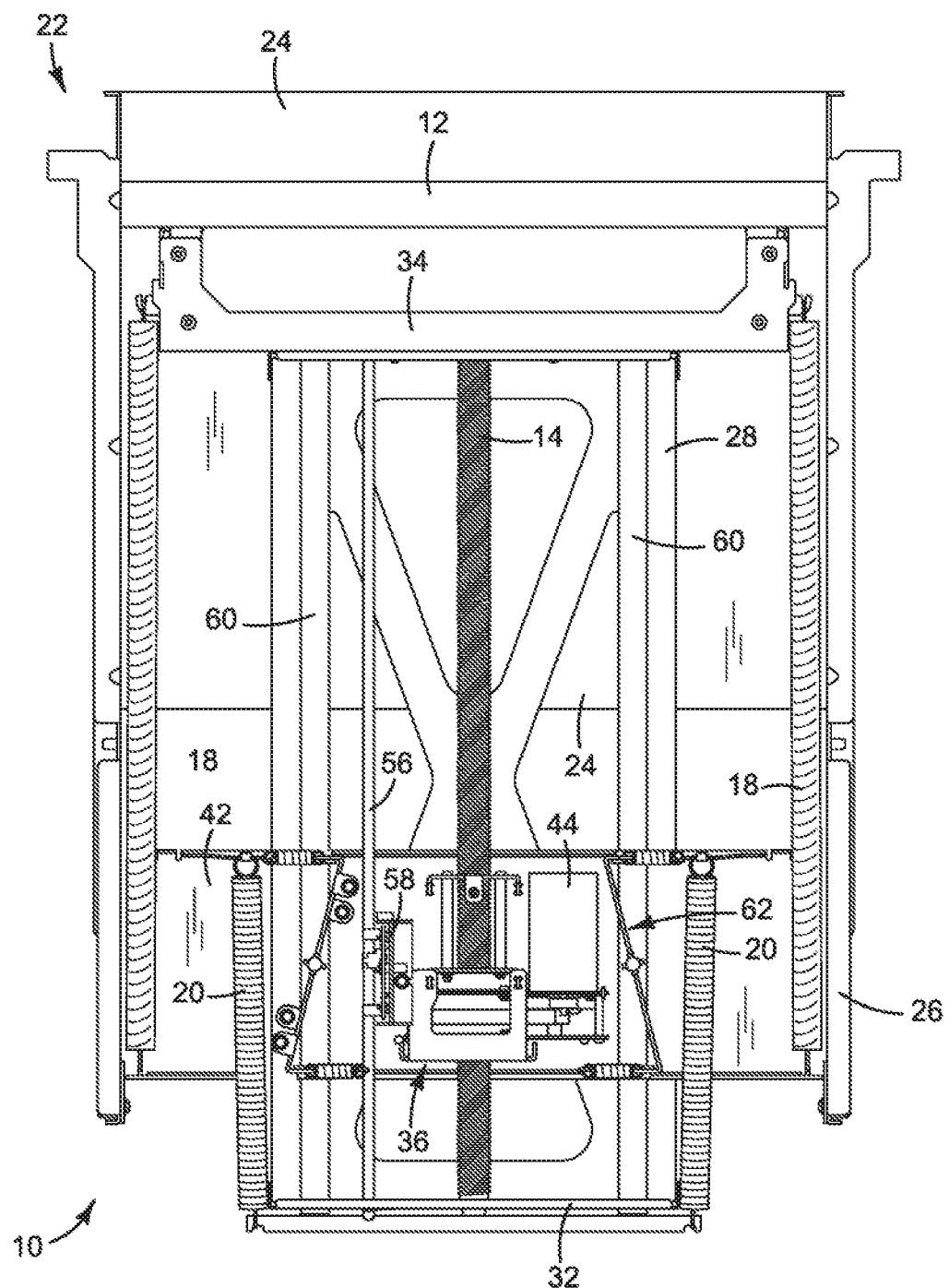
Figure 4:
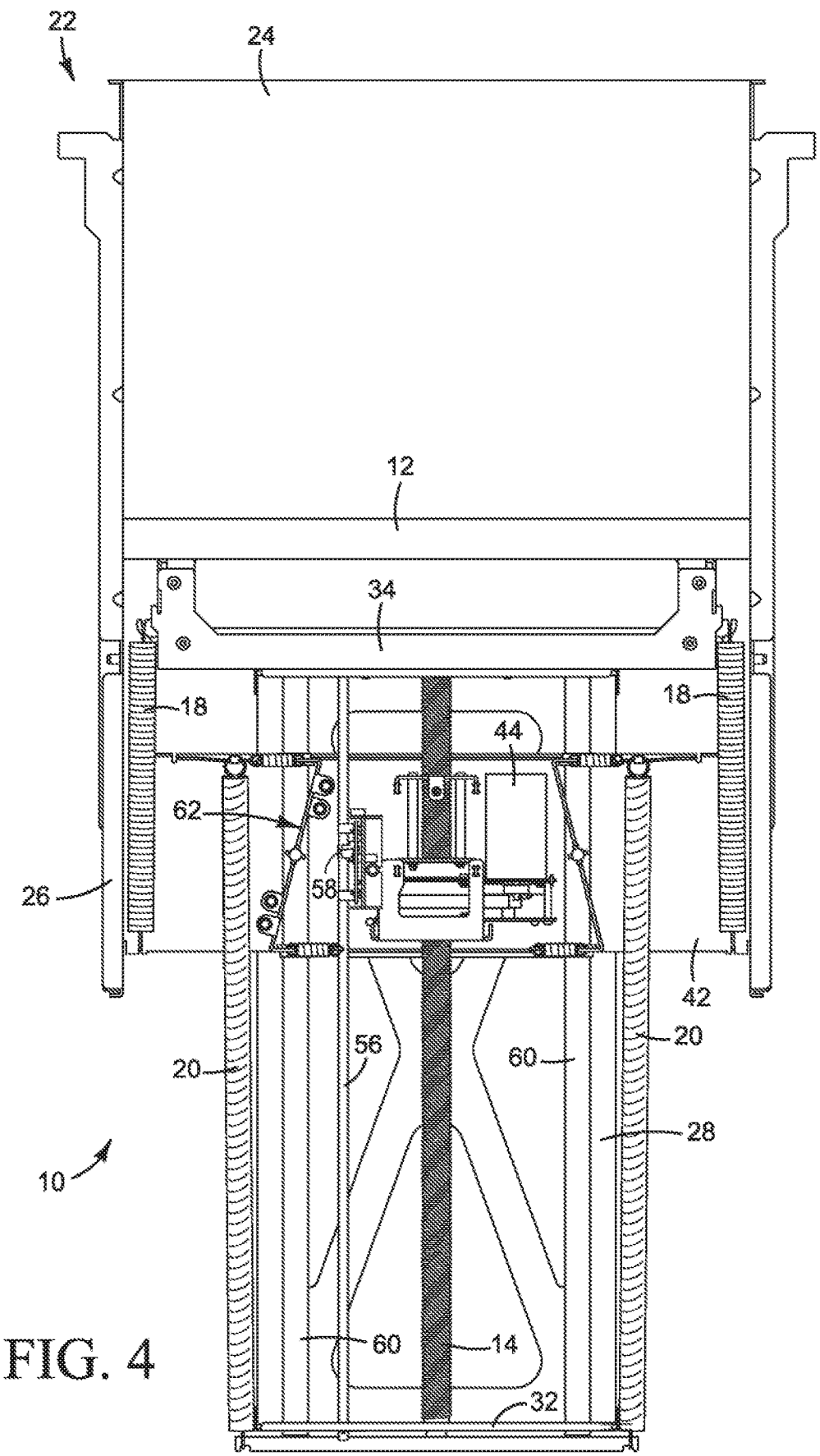
Figure 5:
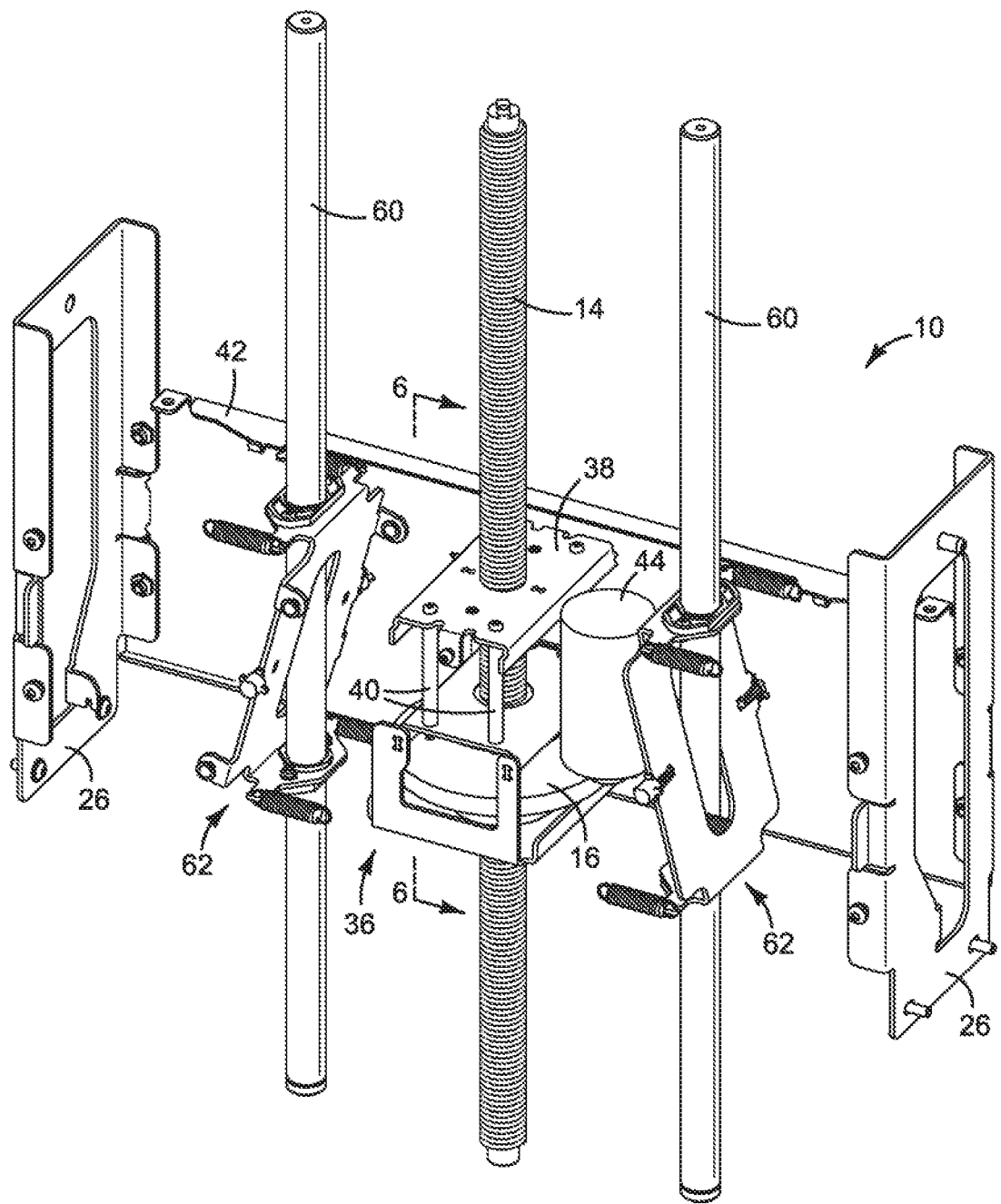
FIG. 5 is an isometric detail view illustrating the example leadscrew drive assembly and guide rod bearing assemblies in the lift of FIGS. 2-4.
Figure 6:
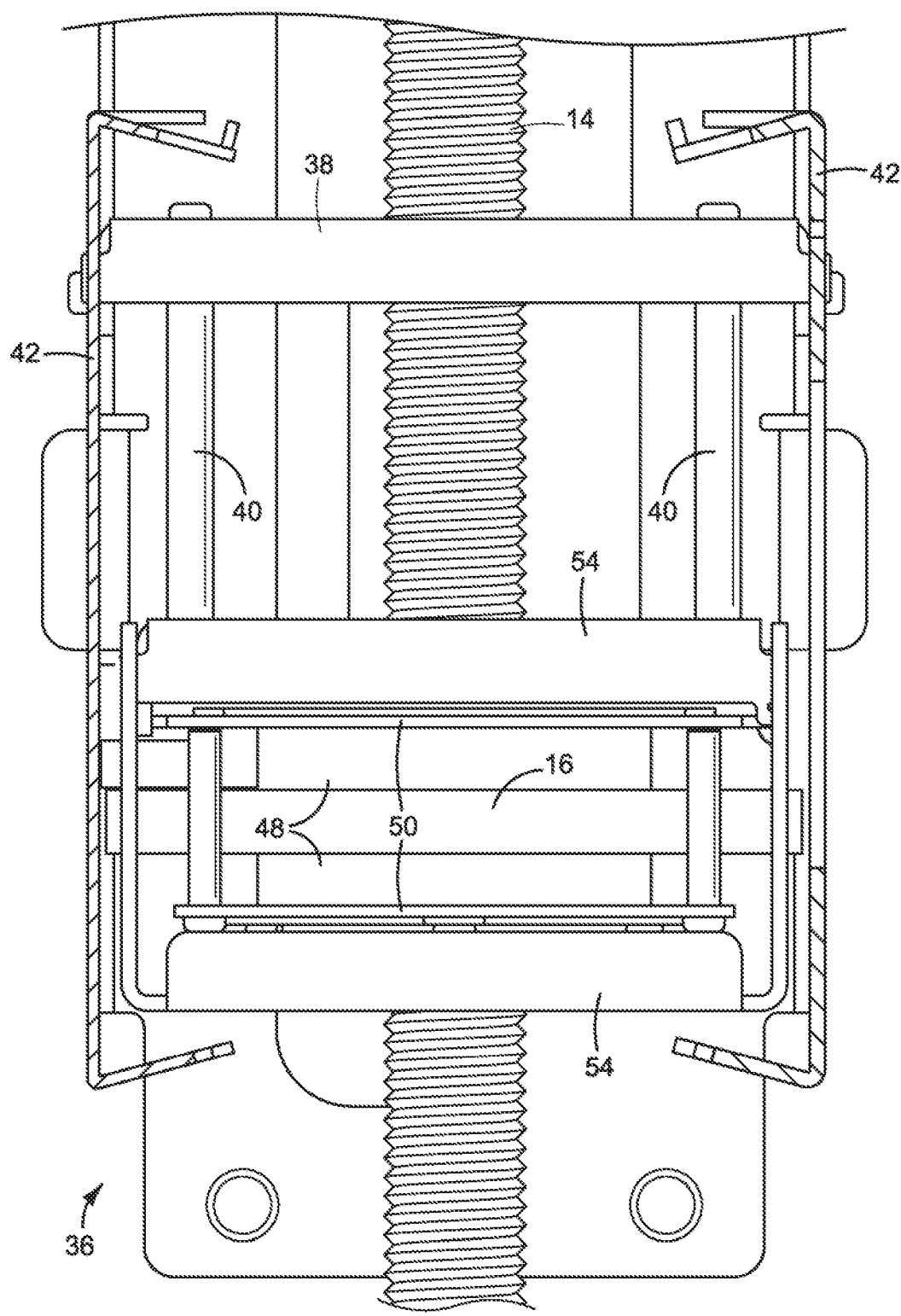
FIGS. 6-9 are detail views of the example leadscrew drive assembly shown in FIGS. 2-5.
Figure 7:
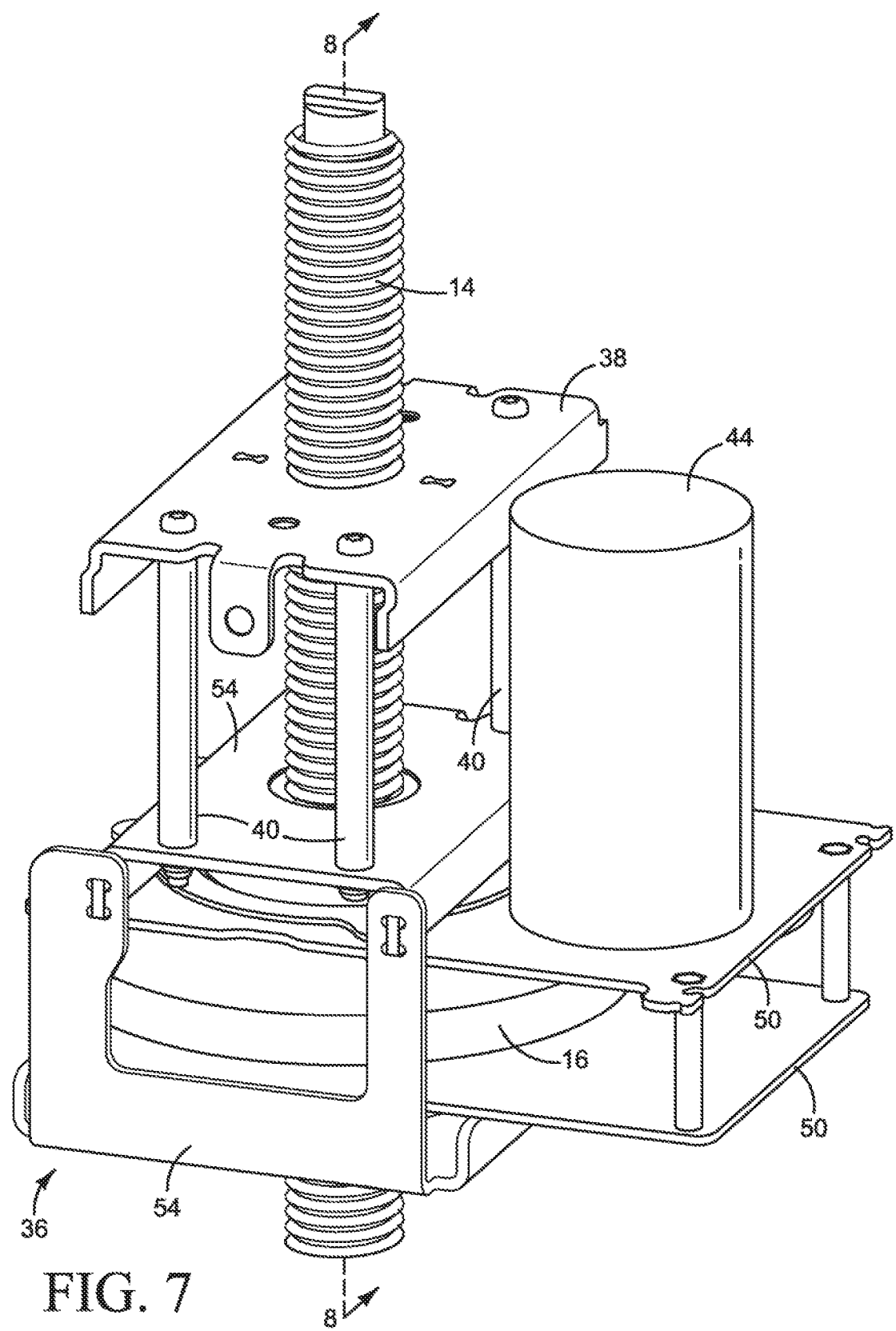
Figure 8:
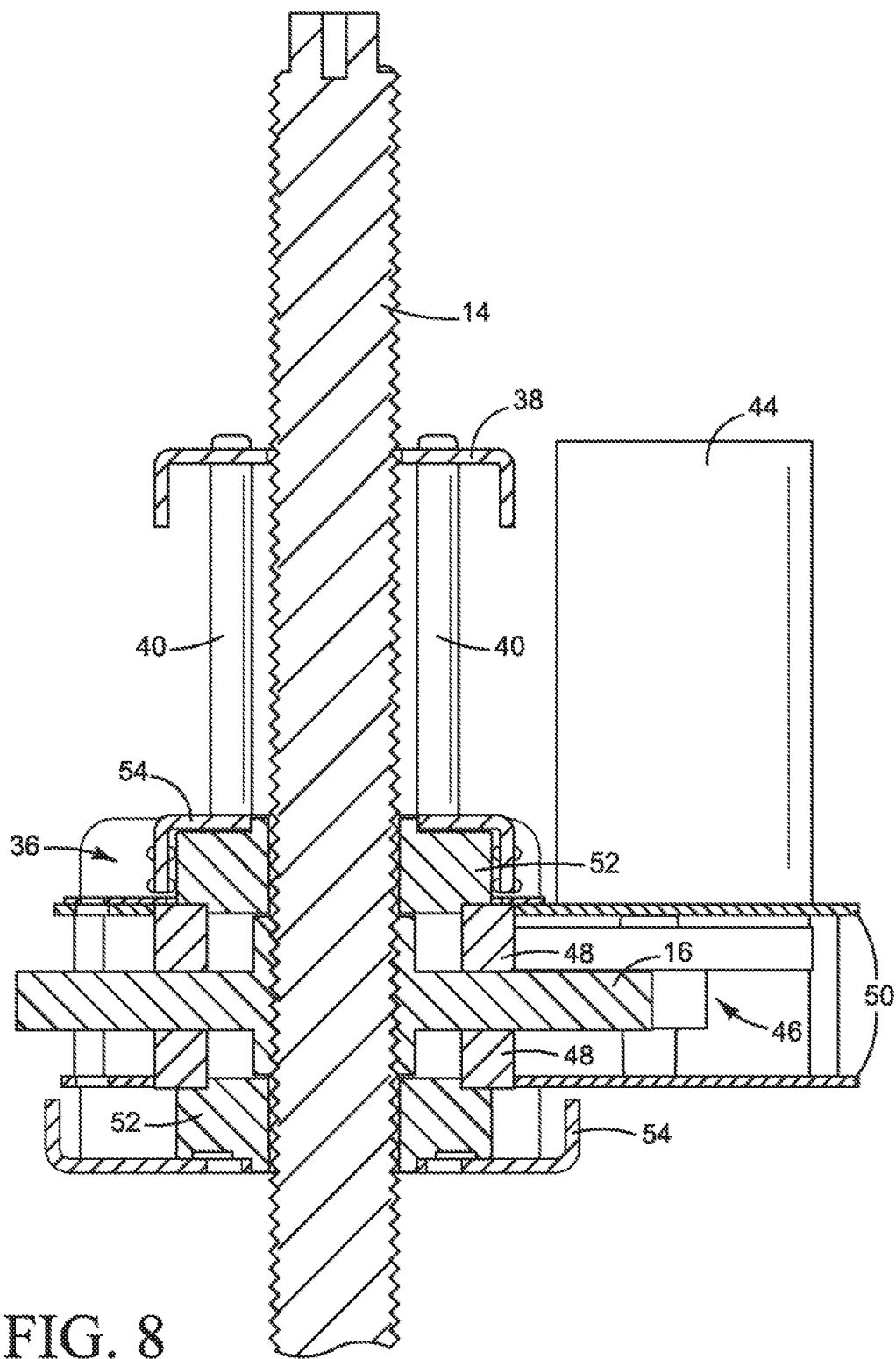
Figure 9:
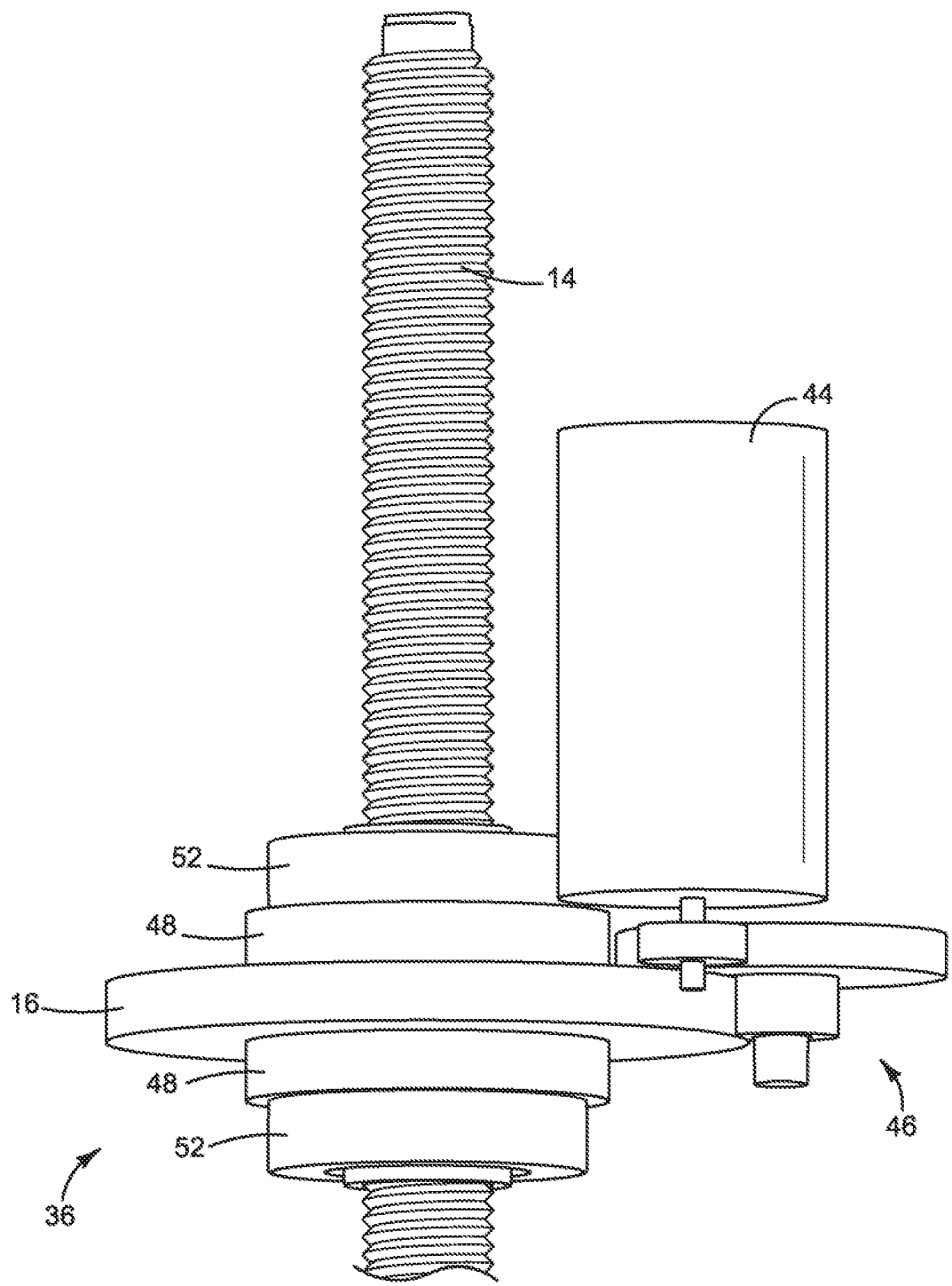
Figure 11:
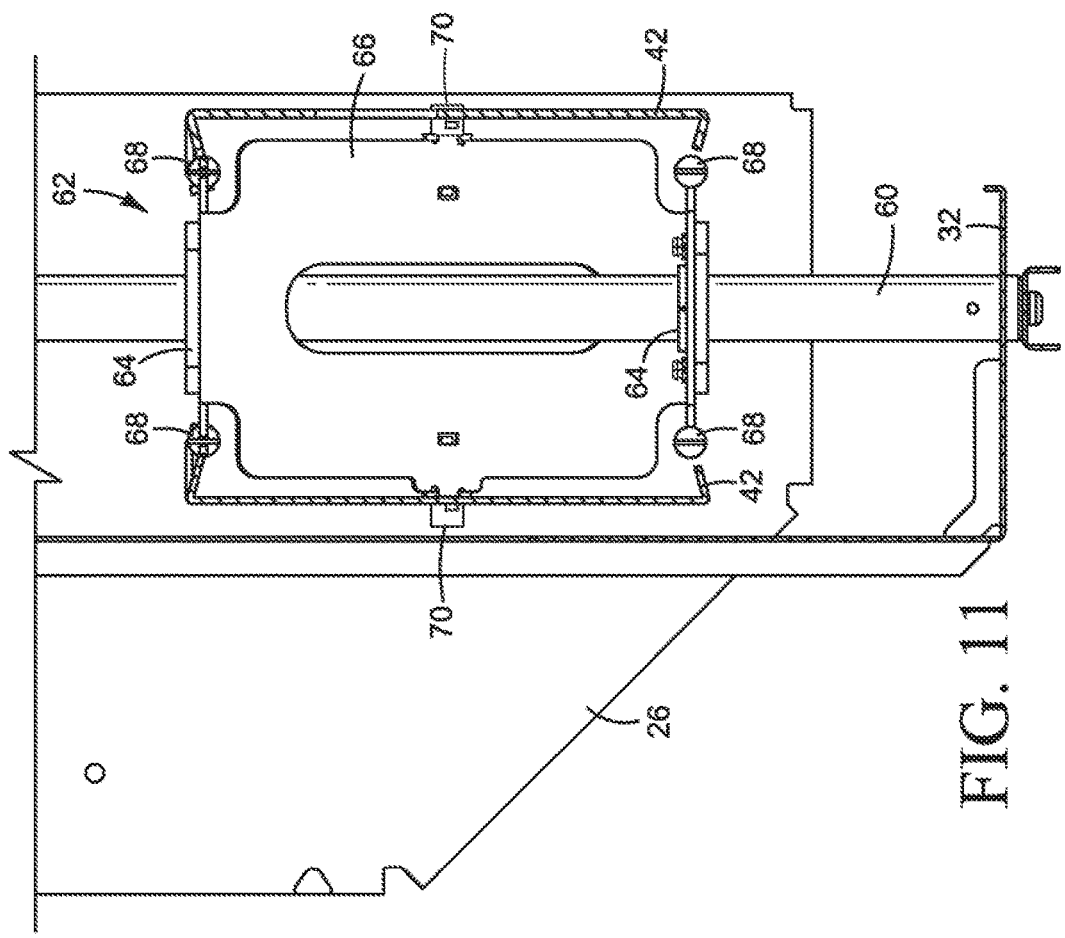
FIGS. 10 and 11 are detail views of the example guide rod bearing assemblies shown in FIGS. 2-5.
Figure 10:
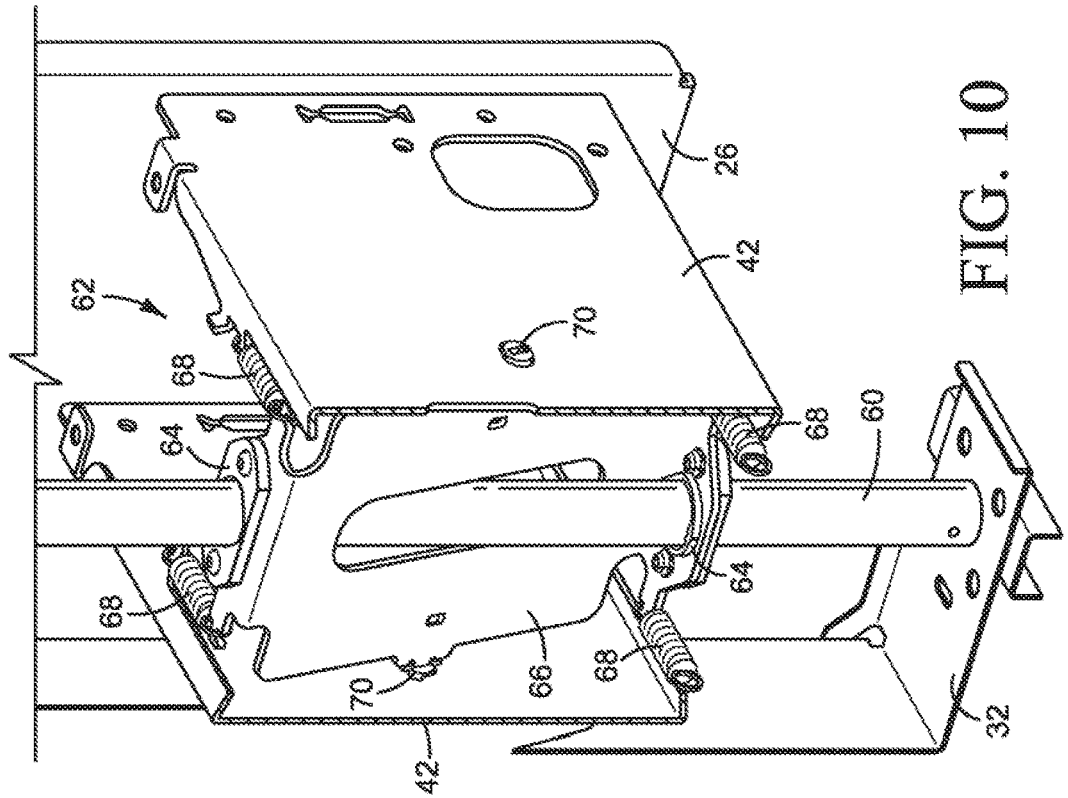

FIGS. 2-4 illustrate one example of a build unit 22 for an additive manufacturing machine. FIGS. 2 and 3 show unit 22 with build platform 12 in a raised position. FIG. 4 shows unit 22 with build platform 12 in a lowered position. Referring to FIGS. 2-4, build unit 22 includes platform 12 connected to a lift 10, and a container 24 surrounding platform 12 to contain build material on platform 12 during manufacturing. The front panel of container 24 is omitted from FIGS. 2-4 to show parts that would otherwise be hidden from view.

Container 24 is affixed to or integrated into a stationary chassis 26 that supports the lift components in an additive manufacturing machine. The front panel of chassis 26 is omitted from FIGS. 2-4 to show parts that would otherwise be hidden from view. Although it is expected that build unit 22 usually will be implemented as a stand-alone unit with lift chassis 26 mounted into the machine chassis, other suitable implementations are possible. Platform 12 sits atop a frame 28 that moves up and down with leadscrew 14 relative to chassis 26. In this example, a single leadscrew 14 is attached to and extends between an upper part 30 of frame 28 and a lower part 32 of frame 28. Platform 12 is mounted to a bracket 34 attached to frame upper part 30.

A pair of anti-backlash springs 18 extend between the upper part 30 of frame 28 and chassis 26 on opposite sides of leadscrew 14. Two pair of counter-balance springs 20 extend between the lower part 32 of frame 28 and chassis 26 on opposite sides of leadscrew 14. Although it is expected that the use of two pair of counter-balance springs 20 will enable greater adaptability for applying counter-balance forces, a single pair of counter-balance springs 20 may be used. In this example, counter-balance springs 20 are positioned inboard from anti-backlash springs 20, closer to leadscrew 14 and drive nut 16. Each pair of counter-balance springs 20 are attached to the front and rear chassis panels 42, respectively. Only the rear chassis panel 42 is shown in FIGS. 2-4. As noted above, the front chassis panel is omitted from FIGS. 2-4. Consequently, the tops of the forward pair of counter-balance springs 20 that are connected to the missing front chassis panel appear unattached in FIGS. 2-4.

Referring now also to the detail views of FIGS. 5-9, leadscrew 14 (and thus frame 28 and platform 12) is mounted to chassis 26 through a drive nut 16. Drive nut 16 is suspended from chassis 26 in a drive assembly 36. In this example, drive assembly 36 hangs from a bracket 38 on suspenders 40 between chassis panels 42 such that drive nut 16 is suspended from above. In other examples, drive nut 16 may be supported from below on suspenders that sit atop a bracket or other support. The front chassis panel 42 is omitted from FIG. 5 to show parts that would otherwise be hidden from view. Suspending drive assembly 36 from or on chassis 26 allows the drive assembly and thus nut 16 to move laterally, introducing compliance into the drive system to accommodate any misalignment with respect to leadscrew 14.

Drive assembly 36 includes drive nut 16 operatively connected to a drive motor 44 through a gear train 46. Drive nut 16 is implemented as a gear nut with internal threads that engage leadscrew 14 and external teeth (not shown) that engage gear train 46. Gears are depicted without teeth in the figures. Drive nut 16 is supported between thrust bearings 48, which are sandwiched between plates 50 and spacers 52 and mounted to brackets 54. As noted above, the entire drive assembly 36 is suspended from bracket 38 on suspenders 40.

In operation, motor 44 is energized to turn nut 16 through gear train 46 incrementally to drive leadscrew 14 carrying platform 12 the desired distance down or up. An encoder strip 56 and strip reader 58, shown in FIGS. 2-4, may be used to help correctly position platform 12. As platform 12 moves down, anti-backlash extension springs 18 contract to reduce their downward force on leadscrew 14 and counter-balance extensions springs 20 extend to increase their upward force on leadscrew 14, as best seen by comparing the extension of springs 18 and 20 in FIGS. 3 and 4. The changing forces compensate for the weight of build material added to platform 12 at each increment of lowering during the layer by layer additive manufacturing process.

Referring to FIGS. 2-5, 10 and 11, lift 10 also includes a pair of guide rods 60 connected between the upper part 30 of frame 28 and the lower part 32 of frame 28 on opposite sides of leadscrew 14. Each guide rod 60 is oriented parallel to leadscrew 14 and mounted to chassis 26 through a bearing assembly 62. Bearing assembly 62 constrains each guide rod 60 laterally while allowing the guide rod to slide up and down with leadscrew 14 and frame 26, to help keep leadscrew 14 and frame 26 properly aligned vertically. In this example, each bearing assembly 62 includes a pair of bearings 64 spaced apart from one another vertically and connected by a diagonally oriented plate 66 that straddles a respective guide rod 60. Each connecting plate 66 is support between front and rear chassis panels 42 on a pivot 70 at or near the center of the plate. Springs 68 connected between each end of plate 66 and chassis panels 42 at a point vertically near each bearing 62 apply a biasing force to the guide rod in one direction at the top bearing and in the opposite direction at the bottom bearing, to help prevent guide rods 60 from titling out of vertical alignment.

The examples shown in the figures and described above illustrate but do not limit the patent, which is defined in the following Claims.

"A", "an" and "the" used in the claims means one or more.

The invention claimed is:

1. A platform lift, comprising:
a rotationally stationary leadscrew to support a platform;
a rotatable nut to drive the leadscrew up and down through a range of motion;
multiple first springs evenly distributed on opposite sides of the leadscrew to apply a continuous downward force to the leadscrew throughout the range of motion; and
multiple second springs evenly distributed on opposites of the leadscrew to apply a continuous upward force to the leadscrew throughout the range of motion.

2. The lift of claim 1, where:
the first springs are to apply a continuous downward force to the leadscrew through the range of motion that decreases in magnitude when the leadscrew moves down and increases in magnitude when the leadscrew moves up; and
the second springs are to apply a continuous upward force to the leadscrew through the range of motion that increases in magnitude when the leadscrew moves down and decreases in magnitude when the leadscrew moves up.

3. The lift of claim 2, where the first springs and the second springs are to apply their respective forces so a net downward force acting on the leadscrew is greater than a net upward force acting on the leadscrew throughout the range of motion, excluding forces exerted on the leadscrew by the nut.

4. The lift of claim 1, where the first springs are positioned outboard from the second springs.

5. A lift to raise and lower a platform, comprising:
a stationary chassis;
a frame movable relative to the chassis, the frame having an upper part to hold the platform and a lower part;
a rotationally stationary leadscrew connected to the frame and extending between the upper part of the frame and the lower part of the frame;
a rotatable nut mounted to the chassis and engaging the leadscrew to drive the leadscrew up and down; and
a pair of first extension springs connected between the upper part of the frame and the chassis on opposite sides of the leadscrew.

6. The lift of claim 5, comprising a pair of second extension springs connected between the lower part of the frame and the chassis on opposite sides of the leadscrew.

7. The lift of claim 5, comprising a pair of guide rods connected between the upper part of the frame and the lower part of the frame on opposite sides of the leadscrew, each guide rod oriented parallel to the leadscrew and slidably mounted to the chassis with a respective bearing.

8. The lift of claim 7, where the bearing for each guide rod comprises first and second bearings spaced apart from one another vertically in a bearing assembly and rigidly connected together with a diagonally oriented plate.

9. The lift of claim 8, where each bearing assembly includes:
   a first spring connected between the chassis and the plate near the first bearing and extending in a first direction to apply a force to the first bearing in the first direction; and
   a second spring connected between the chassis and the plate near the second bearing and extending in a second direction opposite the first direction to apply a force to the second bearing in the second direction.

10. The lift of claim 5, where the nut is suspended from the chassis.

11. A build unit for an additive manufacturing machine, comprising:
    a movable platform to support build material;
    a stationary container surrounding the platform to contain build material on the platform;
    a rotationally stationary leadscrew operatively connected to the platform so that the platform moves down and up with the leadscrew;
    a rotatable nut to drive the leadscrew up and down through a range of motion;
    multiple first springs evenly distributed on opposite sides of the leadscrew to apply a continuous downward force to the leadscrew through the range of motion, the downward force decreasing in magnitude when the leadscrew moves down and increasing in magnitude when the leadscrew moves up; and
    multiple second springs evenly distributed on opposite sides of the leadscrew to apply a continuous upward force to the leadscrew through the range of motion, the upward force increasing in magnitude when the leadscrew moves down and decreasing in magnitude when the leadscrew moves up.

12. The unit of claim 11, where the nut is suspended in a horizontal plane, movable laterally at the urging of the leadscrew.

13. The unit of claim 11, comprising:
    a stationary chassis, the container and the nut mounted to the chassis;
    a frame movable relative to the chassis, the frame having an upper part supporting the platform and the leadscrew connected to the frame and extending between the upper part of the frame and a lower part of the frame such that the frame and the platform move down and up with the leadscrew;
    the first springs connected between the upper part of the frame and the chassis; and
    the second springs connected between the lower part of the frame and the chassis.

14. The unit of claim 13, comprising a pair of guide rods connected between the upper part of the frame and the lower part of the frame on opposite sides of the leadscrew, each guide rod oriented parallel to the leadscrew and slidably mounted to the chassis.

* * * * *